W. E. BROOKE.
Saw-Teeth.
No. 205,042. Patented June 18, 1878.
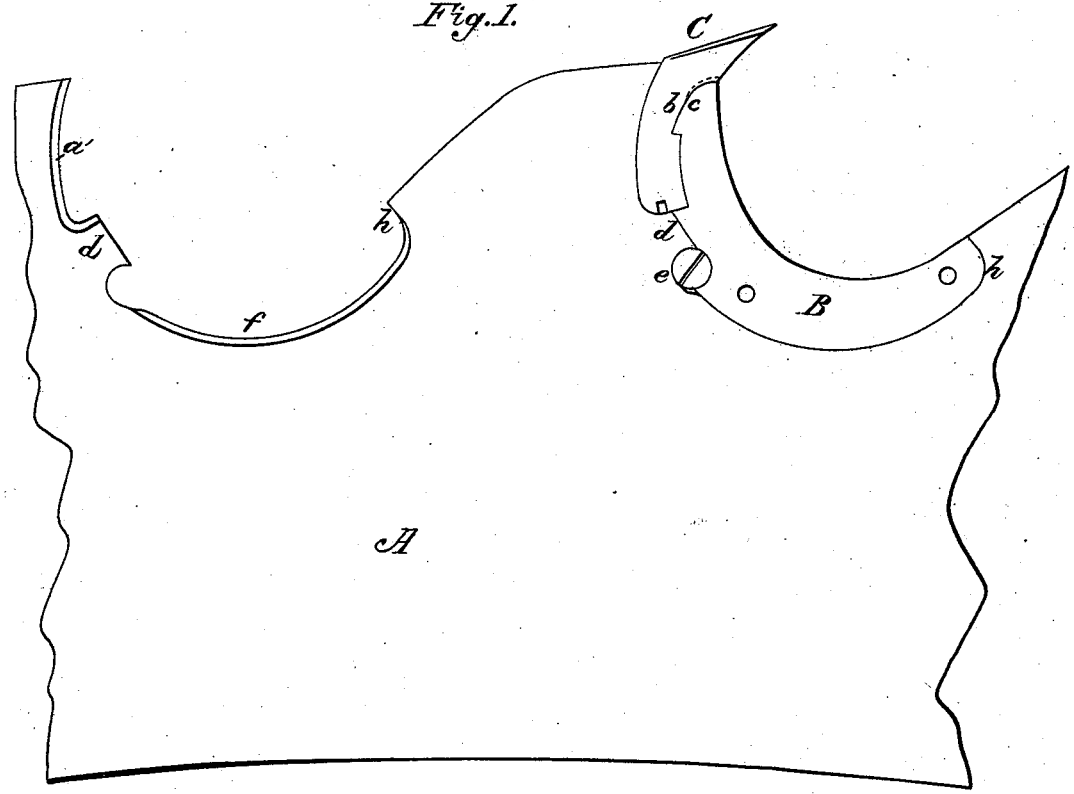
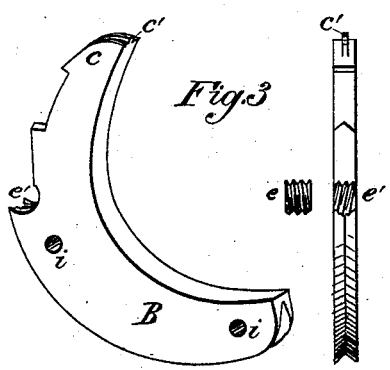
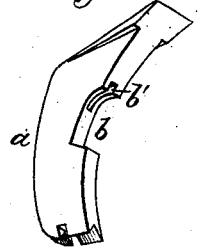
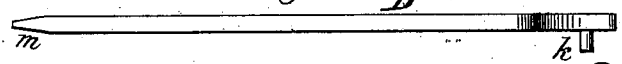
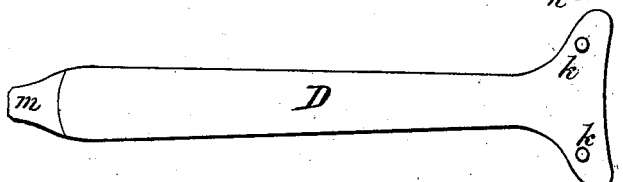
Attest:
F. H. Schott.
Fred E. Tasker.
Inventor:
Wm. E. Brooke
by Jno. Tasker & Co
atty

UNITED STATES PATENT OFFICE.

WILLIAM E. BROOKE, OF TRENTON, NEW JERSEY.

IMPROVEMENT IN SAW-TEETH.

Specification forming part of Letters Patent No. 205,042, dated June 18, 1878; application filed May 23, 1878.

*To all whom it may concern:*

Be it known that I, WILLIAM E. BROOKE, of Trenton, in the county of Mercer and State of New Jersey, have invented certain new and useful Improvements in Saw-Teeth; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of my invention is to provide a means for so locking the detachable teeth of a saw that they may be readily removed and replaced in such a manner as to prevent all injurious strain upon the saw-blade; and the invention consists in the employment of a retaining-spring locking-plate of peculiar construction and a retaining-screw, together with certain peculiarities of form in the tooth and the recess in the saw-plate into which it is inserted, all as will be hereinafter fully described, and then specifically pointed out in the claims.

In the drawings, Figure 1 is a side view of a section of saw with the tooth inserted in one recess, while the adjacent recess is left vacant to show more plainly its form. Fig. 2 is a perspective view of a tooth. Fig. 3 shows a perspective and edge view of the spring locking-plate and the screw by which it is retained in position. Fig. 4 shows the implement used for removing and inserting the teeth.

A is the saw-blade; B, the spring locking-plate, and D the saw-tooth. This tooth is expanded or swaged at its point, so that it shall cut a kerf wide enough to clear the saw-plate, thus preventing friction and the consequent heating of the plate. The back side of the tooth $a$, which may be straight or of convex outline, is furnished with a triangular groove, which also extends around its lower end, thus giving it a firm seat upon the triangular tongue of the saw-plate in the recess $a'$. The front of the tooth presents a concave outline, indented by the recess $b$ for the reception of the hook $c$. Upon the outer end of the spring locking-plate B an additional groove, $b'$, is formed in the tooth, which receives a corresponding tongue, $c'$, on the extremity of the spring, which prevents all lateral movement of the tooth. An abutting piece, $d$, projects inward from the general circular outline of the recess in the plate, and serves as a support to the tooth against the thrust of the cut, and also furnishes a proper position for cutting a portion of the thread with which the screw $e$ engages to hold the spring locking-plate B in position. This spring locking-plate has a general lunar outline, its inner curve forming the throat of the tooth, while the outer is provided for one-half its length, or thereabout, with a triangular groove, which gives it a firm seat upon the similarly-shaped tongue $f$ of the saw-plate. The lower end of the spring locking-plate abuts firmly against the projection $h$ of the saw-plate, while the opposite end, provided with the hook $c$, rests in the recess $b$ of the tooth. A semicircular threaded recess, $e'$, serves to form, in connection with the corresponding recess in the saw-plate, an orifice for the reception of the screw $e$, which, when placed in position, connects the parts and assists to prevent the lateral movement of the spring.

Two holes, $i\ i$, are formed in the spring for the reception of corresponding pins $k\ k$ in the tool D, one end of which forms a screw-driver, $m$, for use in connection with the screw $e$.

To insert the tooth, it may be placed in its proper position in the saw-plate, and the spring locking-plate brought forcibly into position against it by means of the tool D, after which the screw is inserted, which retains the parts firmly in position until released.

Hitherto the greatest objection to inserted teeth has been the tendency they have to strain the saw when they are held in place by wedges or rivets, which must, if sufficiently tight to retain the tooth in place, necessarily exert a great expansive force upon the periphery of the saw-blade, causing it to be quickly affected by very slight changes of temperature, such as are constantly occurring during the actual working of circular saws, causing the saw-plate to buckle, and increasing the difficulty by adding to the friction, making the saw deflect from its direct course through the log, thus producing uneven and unmerchantable lumber. In my improved saw, although the spring locking-plate and tooth fit accurately to their places with sufficient tightness to prevent displacement, no such force is required to insert them as can in any any way affect the integrity of the blade.

I am aware that a saw-tooth has been secured to the blade by inserting a screw in a threaded orifice made partly in the tooth and partly in the saw-blade.

I am aware that a locking-plate adapted to a recess cut in the blade or tooth is not new, and I do not claim such device broadly; but,

Having thus described my invention, I claim as new, and desire to secure by Letters Patent, the following:

1. The combination, with the saw-blade, of the spring locking-plate B and its retaining-screw e, inserted partly in the saw-blade and partly in the spring locking-plate, substantially as and for the purpose specified.

2. The saw-tooth provided with the recess b and groove b', in combination with the spring locking-plate B, having hook c and tongue c', fitted into groove b', as and for the purpose set forth.

3. A saw-plate provided in its tooth-holding recess with the projection d, in combination with the spring locking-plate, retaining-screw, and tooth, all arranged and operating for joint support, substantially as shown and described.

In testimony that I claim the foregoing as my own I hereunto affix my signature in presence of two witnesses.

WM. E. BROOKE.

Witnesses:
E. A. DICK,
FRED. E. TASKER.